United States Patent
Mao et al.

(10) Patent No.: US 12,531,175 B2
(45) Date of Patent: Jan. 20, 2026

(54) SINTERED NEODYMIUM IRON BORON MAGNET AND METHOD OF PREPARING THE SAME

(71) Applicant: JL MAG RARE EARTH CO., LTD., Ganzhou (CN)

(72) Inventors: Huayun Mao, Jiangxi (CN); Congyao Mao, Jiangxi (CN); Zhifeng Huang, Jiangxi (CN); Changshan Sun, Jiangxi (CN); Yunpeng Chen, Jiangxi (CN)

(73) Assignee: JL MAG RARE EARTH CO., LTD, Ganzhou (CN)

( * ) Notice: Subject to any disclaimer, the term of this patent is extended or adjusted under 35 U.S.C. 154(b) by 607 days.

(21) Appl. No.: 17/905,066

(22) PCT Filed: Jul. 5, 2021

(86) PCT No.: PCT/CN2021/104449
§ 371 (c)(1),
(2) Date: Aug. 26, 2022

(87) PCT Pub. No.: WO2022/227278
PCT Pub. Date: Nov. 3, 2022

(65) Prior Publication Data
US 2024/0029928 A1    Jan. 25, 2024

(30) Foreign Application Priority Data

Apr. 30, 2021 (CN) .......................... 202110484517.2
Apr. 30, 2021 (CN) .......................... 202110486410.1
Apr. 30, 2021 (CN) .......................... 202110486417.3

(51) Int. Cl.
*H01F 1/057* (2006.01)
*H01F 41/02* (2006.01)

(52) U.S. Cl.
CPC ......... *H01F 1/0577* (2013.01); *H01F 1/0573* (2013.01); *H01F 41/0266* (2013.01); *H01F 41/0273* (2013.01)

(58) Field of Classification Search
CPC .. H01F 1/0577; H01F 41/0266; H01F 1/0573; H01F 41/0273
See application file for complete search history.

(56) References Cited

U.S. PATENT DOCUMENTS

| | | | |
|---|---|---|---|
| 2002/0033205 A1 | 3/2002 | Tamura et al. | |
| 2012/0007014 A1 | 1/2012 | Gong et al. | |

FOREIGN PATENT DOCUMENTS

| | | | | |
|---|---|---|---|---|
| CN | 102436889 A | 5/2012 | | |
| CN | 108281246 A | 7/2018 | | |
| CN | 111009369 A | 4/2020 | | |
| CN | 111081444 A | 4/2020 | | |
| CN | 111243812 A | * 6/2020 | ........... | H01F 1/0577 |
| CN | 111599564 A | 8/2020 | | |
| EP | 4016556 A1 | 6/2022 | | |
| JP | 2004244702 A | 9/2004 | | |
| JP | 2006265601 A | 10/2006 | | |
| JP | 2011210823 A | 10/2011 | | |
| JP | 2022543490 A | 10/2022 | | |
| WO | WO-2017018291 A1 | 2/2017 | | |
| WO | WO-2021063061 A1 | 4/2021 | | |

OTHER PUBLICATIONS

CN111243812A: Espacenet English machine translation (Year: 2020).*
International Search Report for Corresponding PCT Application No. PCT/CN2021/104449 dated Jan. 27, 2022.
JPO Office Action for Corresponding JP Application No. 2022-551233 dated Jul. 25, 2023.

* cited by examiner

*Primary Examiner* — Adil A. Siddiqui
(74) *Attorney, Agent, or Firm* — Honigman LLP; Matthew H. Szalach

(57) ABSTRACT

A sintered neodymium iron boron magnet as shown in the formula RxT100-x-y1-y2-zMy1Ay2Bz is provided according to the present application, which specifically includes three different technical solutions.

7 Claims, No Drawings

SINTERED NEODYMIUM IRON BORON MAGNET AND METHOD OF PREPARING THE SAME

The present application is a national phase application of PCT international patent application PCT/CN2021/104449, filed on Jul. 5, 2021 which claims the priorities to Chinese patent application No. 202110484517.2 titled "ZIRCONIUM-CONTAINING SINTERED NEODYMIUM IRON BORON MAGNET AND METHOD OF PREPARING THE SAME", filed with the China National Intellectual Property Administration on Apr. 30, 2021, Chinese patent application No. 202110486417.3 titled "TITANIUM-CONTAINING SINTERED NEODYMIUM IRON BORON MAGNET AND METHOD OF PREPARING THE SAME", filed with the China National Intellectual Property Administration on Apr. 30, 2021, Chinese patent application No. 202110486410.1 titled "NIOBIUM-CONTAINING SINTERED NEODYMIUM IRON BORON MAGNET AND METHOD OF PREPARING THE SAME", filed with the China National Intellectual Property Administration on Apr. 30, 2021, all of which are all incorporated herein by reference in their entireties.

FIELD

The present application relates to the technical field of magnetic materials, in particular to a sintered neodymium iron boron magnet and a method of preparing the sintered neodymium iron boron magnet.

BACKGROUND

A sintered neodymium iron boron is a permanent magnet with the highest energy density discovered by humans so far, which has been commercialized on a large scale. Since its discovery, the sintered neodymium iron boron magnet has been widely used in many fields such as computer hard disks, hybrid vehicles, medical care, and wind power generation. Its application range and output are still increasing year by year, especially in the field of new energy vehicles.

Many applications of the sintered neodymium iron boron magnets are in high temperature environments, and thus it requires not only to high remanence, but also high coercivity. The coercivity is a main parameter of the permanent magnet material. The higher the coercivity is, the stronger the anti-demagnetization ability is. In applications, it requires that the coercivity of the sintered neodymium iron boron magnet is as high as possible, thereby ensuring that the sintered neodymium iron boron magnet has better temperature stability and can work under higher temperature conditions. A common method to improve the coercivity of the sintered neodymium iron boron magnets is to use Dy and Tb to partially replace Nd in order to improve the coercivity. However, heavy rare earth Dy and Tb will reduce the remanence; and because Dy and Tb are vulnerable to the impact of rare earth policy, there is a risk of price instability or large fluctuations.

Therefore, how to further enhance the comprehensive performance of the magnet in order to improve the coercivity, remanence and magnetic energy product of the magnet without using or less using heavy rare earth elements has become a focus and a hot topic of research by technicians in this field.

SUMMARY

A technical problem solved by the present application is to provide a sintered neodymium iron boron magnet, which has higher remanence, coercivity and magnetic energy product.

In view of this, the present application provides a sintered neodymium iron boron magnet as shown in formula (I);

$$R_xT_{100-x-y1-y2-z}M_{y1}A_{y2}B_z \quad (I);$$

in technical solution 1: x, y1, y2 and z are mass percentages of corresponding elements, 28.5%≤x≤32.5%, 0%≤y1≤1.0%, 0.67%≤y2≤2.4%, 0.85%≤z≤1.0%;

R is selected from one or more of Pr, Nd, Dy, Tb and Ho;

M is selected from one or more of Ti, Nb, Hf and Mn; and a content of Ti is 0 to 0.12%, a content of Nb is 0 to 0.29%, a content of Hf is 0 to 1.0%, and a content of Mn is 0 to 1.0%;

A is Cu, Ga, Al and Zr; and

T is selected from Fe and Co, a content of Co is 0.3% to 2.5%, and surplus is Fe;

or, in technical solution 2: x, y1, y2 and z are mass percentages of corresponding elements, 28.5%≤x≤32.0%, 0%≤y1≤1.0%, 0.60%≤y2≤2.30%, 0.86%≤z≤0.98%;

R is selected from one or more of Pr, Nd, La, Ce, Dy, Tb and Ho;

M is selected from one or more of Zr, Nb, Hf and Mn, and a content of Zr is 0 to 0.19%, a content of Nb is 0 to 0.29%, a content of Hf is 0 to 1.0%, and a content of Mn is 0 to 1.0%;

A is Cu, Ga, Al and Ti, and a content of Cu is 0.2% to 0.55%, a content of Ga is 0.25% to 0.55%, a content of Al is 0.02% to 0.8%, and a content of Ti is 0.13% to 0.4%; and T is selected from Fe and Co, a content of Co is 0.2% to 2.0%, and surplus is Fe;

or, in technical solution 3: x, y1, y2 and z are mass percentages of corresponding elements, 28.7%≤x≤32.8%, 0%≤y1≤1.0%, 0.77%≤y2≤2.60%, 0.86%≤z≤1.01%;

R is selected from one or more of Pr, Nd, Dy and Tb,

M is selected from one or more of Ti, Zr, Hf and Mn, and a content of Zr is 0 to 0.19%, a content of Ti is 0 to 0.12%, a content of Hf is 0 to 1.0%, and a content of Mn is 0 to 1.0%;

A is Cu, Ga, Al and Nb, and a content of Cu is 0.2% to 0.55%, a content of Ga is 0.25% to 0.55%, a content of Al is 0.02% to 0.7%, and a content of Nb is 0.3% to 0.8%; and T is selected from Fe and Co, a content of Co is 0.4% to 2.3%, and surplus is Fe.

Preferably, for the technical solution 1: a content of Pr is 0 to 14.5%, a content of Nd is 14% to 32.5%, a content of Tb is 0 to 5.0%, and a content of Dy is 0 to 5.0%.

Preferably, the content of Pr is 5% to 10%, the content of Nd is 20% to 25.5%, and the content of Dy is 0 to 3%.

Preferably, for the technical solution 1: a content of Cu is 0.2% to 0.6%, a content of Ga is 0.25% to 0.55%, a content of Al is 0.02% to 0.6%, and a content of Zr is 0.2% to 0.65%.

Preferably, for the technical solution 1: a content of Cu is 0.3% to 0.5%, a content of Ga is 0.35% to 0.5%, a content of Al is 0.1% to 0.5%, and a content of Zr is 0.3% to 0.6%.

Preferably, for the technical solution 1: the content of Co is 0.5% to 2.0%, and a content of B is 0.90% to 0.98%.

Preferably, for the technical solution 1: M is selected from one or both of Ti and Nb, the content of Ti is 0 to 0.1%, and the content of Nb is 0 to 0.15%.

Preferably, for the technical solution 2: a content of Pr is 0 to 14.5%, a content of Nd is 14% to 32.5%, a content of Tb is 0 to 4.5%, and a content of Dy is 0 to 4.5%.

Preferably, the content of Pr is 7% to 9%, the content of Nd is 20% to 25.5%, and the content of Dy is 0 to 3%.

Preferably, for the technical solution 2: a content of Cu is 0.2% to 0.5%, a content of Ga is 0.35% to 0.45%, a content of Al is 0.1% to 0.6%, and a content of Ti is 0.2% to 0.35%.

Preferably, for the technical solution 2: the content of Co is 0.5% to 1.5%, and a content of B is 0.90% to 0.98%.

Preferably, for the technical solution 2: M is selected from one or both of Zr and Nb, the content of Zr is 0 to 0.15%, and the content of Nb is 0 to 0.20%.

Preferably, for the technical solution 3: a content of Pr is 0 to 14.5%, a content of Nd is 14.5% to 32%, a content of Tb is 0 to 4.3%, and a content of Dy is 0 to 4.3%.

Preferably, for the technical solution 3: the content of Pr is 5% to 10%, the content of Nd is 20% to 26%, and the content of Dy is 1.5% to 3%.

Preferably, for the technical solution 3: a content of Cu is 0.25% to 0.50%, a content of Ga is 0.30% to 0.45%, a content of Al is 0.1% to 0.45%, and a content of Nb is 0.4% to 0.55%.

Preferably, for the technical solution 3: the content of Co is 0.5% to 1.5%, and a content of B is 0.90% to 0.96%.

Preferably, for the technical solution 3: M is selected from one or both of Zr and Ti, the content of Zr is 0 to 0.15%, and the content of Ti is 0 to 0.10%.

A method of preparing the above sintered neodymium iron boron magnet is provided according to the present application, which includes the following steps:

A) carrying out a strip casting treatment to a raw material of a neodymium iron boron sintered magnet to obtain neodymium iron boron strip casting;

B) carrying out hydrogen decrepitation and jet milling on the neodymium iron boron strip casting in sequence to obtain neodymium iron boron powder; and C) orientation molding and sintering the neodymium iron boron powder in sequence to obtain the sintered neodymium iron boron magnet.

Preferably, a temperature of the strip casting treatment is 1400° C. to 1500° C., and a thickness of the neodymium iron boron strip casting is 0.10 mm to 0.60 mm;

in the hydrogen decrepitation process, a hydrogen absorption time is 1 h to 3 h, a hydrogen absorption temperature is 20° C. to 300° C., a dehydrogenation time is 3 h to 7 h, and a dehydrogenation temperature is 550° C. to 600° C.; and in the jet milling process, a lubricant is added for milling, and the lubricant is 0.02% to 0.1% of a mass of a mixed fine powder obtained by the hydrogen decrepitation, and a particle size of the je milled powder is 2 μm to 10 μm.

Preferably, the orientation molding comprises orientation pressing and isostatic pressing in sequence;

a magnetic field strength of the orientation molding is 1.2 T to 3 T;

a sintering temperature is 1000° C. to 1200° C., a time is 5 h to 15 h, and a vacuum degree is less than or equal to 0.02 Pa;

where the method further includes an aging treatment after the sintering, and the aging treatment comprises a first aging treatment and a second aging treatment;

a temperature of the first aging treatment is 800° C. to 980° C., and a time of the first aging treatment is 2 h to 15 h; and a temperature of the second aging treatment is 420° C. to 580° C., and a time of the second aging treatment is 1 h to 8 h.

For the technical solution 1: the present application provides a zirconium-containing sintered neodymium iron boron magnet, which adds Zr element besides many alloy elements, optimizes and designs a specific addition amount, and rationally designs the remaining components, so that Zr element and Cu element cooperates to form an alloy phase of Zr—Cu, so that the zirconium-copper phase enriched in the grain boundary of the magnetic phase becomes the center of the pinning field of the "pinning" domain wall movement when the magnet is demagnetized, which hinders the movement of the magnetic domain wall, thereby improving the intrinsic coercivity of the magnet alloy. Meanwhile, the zirconium-copper phase has a "pinning" effect on the grain boundary movement of the magnetic phase grains, which increases the sintering resistance temperature, and does not cause abnormal grain growth, and can effectively prevent the change of the magnetic phase and refine the grains, thereby improving the remanence, coercivity and magnetic energy product of the magnet alloy. Cu element and Ga element form a Cu—Ga alloy phase, which provides wettability in the grain boundary with its low melting point, and has an effect on weakening the magnetic exchange coupling so as to improve the coercivity to a certain extent. However, it has inherent defects that the remanence and magnetic energy product cannot be improved.

The neodymium iron boron magnet and the method of preparing the same according to the present application can not only prepare a neodymium iron boron magnetic material with high performance, but also can improve the remanence, coercivity and magnetic energy product of the magnet alloy without adding heavy rare earth elements, and the production cost is reduced, the process is simple, the applicability is wide, and it is suitable for large-scale industrial production.

The experimental results show that, compared with the neodymium iron boron magnet of the same type, the coercivity value has increased more than 1.0 kOe under the condition that the remanence is not reduced by using the zirconium-containing neodymium iron boron magnet provided by the present application.

For the technical solution 2: the present application provides a titanium-containing sintered neodymium iron boron magnet, which adds Ti element besides many alloy elements and increases its addition amount, and rationally designs the remaining components, so that Ti element and Cu element cooperate to form an alloy phase of Cu—Ti, so that the copper-titanium phase enriched in the grain boundary of the magnetic phase becomes the center of the pinning field of the "pinning" domain wall movement when the magnet is demagnetized, which hinders the movement of the magnetic domain wall, thereby improving the intrinsic coercivity of the magnet alloy. Meanwhile, the copper-titanium phase has a "pinning" effect on the grain boundary movement of the magnetic phase grains, which increases the sintering resistance temperature, and does not cause abnormal grain growth, and can effectively prevent the change of the magnetic phase and refine the grains, thereby improving the remanence, coercivity and magnetic energy product of the magnet alloy. Cu element and Ga element form a Cu—Ga alloy phase, which provides wettability in the grain boundary with its low melting point, and has an effect on weakening the magnetic exchange coupling. Ti element and B element form Ti—B phase, and the titanium boron phase can optimize the grain boundary to greatly improve the coercivity, reduce the defects of the grain boundary, and improve the anti-demagnetization ability of the grain boundary.

The titanium-containing neodymium iron boron magnet and the method of preparing the same according to the present application can not only prepare a neodymium iron boron magnetic material with high performance, but also can improve the remanence, coercivity and magnetic energy product of the magnet alloy without adding heavy rare earth elements, and the production cost is reduced, and the process is simple, the applicability is wide, and it is suitable for large-scale industrial production.

The experimental results show that, compared with the neodymium iron boron magnet of the same type, the coercivity value has increased more than 1.3 kOe under the condition that the remanence is not reduced by using the neodymium iron boron magnet provided by the present application.

For the technical solution 3: the present application provides a niobium-containing sintered neodymium iron boron magnet, which adds Nb element besides many alloy elements and increases its addition amount, and rationally designs the remaining components, so that Nb element and B element cooperate with each other, so that the niobium-boron phase enriched in the grain boundary of the magnetic phase becomes the center of the pinning field of the "pinning" domain wall movement when the magnet is demagnetized, which hinders the movement of the magnetic domain wall, thereby improving the intrinsic coercivity of the magnet alloy. Meanwhile, the niobium enriched phase has a "pinning" effect on the grain boundary movement of the magnetic phase grains, which can effectively prevent the growth of the magnetic phase and refine the grains, thereby improving the remanence, coercivity and magnetic energy product of the magnet alloy. Cu—Ga—Al alloy phase elements provides wettability in the grain boundary with the low melting point, which has an effect on weakening the magnetic exchange coupling. During sintering, Cu—Ga—Al alloy phase elements enter the structure of the main phase of neodymium iron boron through diffusion, which increases the sintering resistance temperature, and prevents abnormal grain growth, and can only improve the coercivity to a certain extent. However, it has inherent defects that the remanence and magnetic energy product cannot be improved.

The neodymium iron boron magnet and the method of preparing the same according to the present application can not only prepare a neodymium iron boron magnetic material with high performance, but also can improve the remanence, coercivity and magnetic energy product of the magnet alloy without adding heavy rare earth elements, and the production cost is reduced, and the process is simple, the applicability is wide, and it is suitable for large-scale industrial production.

The experimental results show that, compared with the neodymium iron boron magnet of the same type, the coercivity value has increased more than 1.0 kOe under the condition that the remanence is not reduced by using the neodymium iron boron magnet provided by the present application.

DETAILED DESCRIPTION

In order to further understand the present application, the preferred embodiments of the present application are described below in conjunction with the examples, but it should be understood that these descriptions are only for further illustrating the features and advantages of the present application, rather than limiting the claims of the present application.

All raw materials in the present application are not particularly limited in their purity, preferably industrial purity or conventional purity used in the field of neodymium iron boron magnets.

The technical solution 1, technical solution 2 and technical solution 3 provided by the present application are described in detail below.

For technical solution 1:

The present application provides a zirconium-containing sintered neodymium iron boron magnet as shown in formula (I);

$$R_x T_{100-x-y1-y2-z} M_{y1} A_{y2} B_z \qquad (I);$$

where, x, y1, y2 and z are mass percentages of corresponding elements, $28.5\% \leq x \leq 32.5\%$, $0\% \leq y1 \leq 1.0\%$, $0.67\% \leq y2 \leq 2.4\%$, $0.85\% \leq z \leq 1.0\%$;

R is selected from one or more of Pr, Nd and RH, and RH is selected from one or more of Dy and Tb;

M is selected from one or more of Ti, Nb, Hf and Mn; and a content of Ti is 0 to 0.12%, a content of Nb is 0 to 0.29%, a content of Hf is 0 to 1.0%, and a content of Mn is 0 to 1.0%;

A is Cu, Ga, Al and Zr; and

T is selected from Fe and Co, a content of Co is 0.3% to 2.5%, and surplus is Fe.

The specific definition of the formula I is not particularly limited in the present application, and such expressions well known to those skilled in the art can be used, which can be understood as a mass ratio.

In the general formula described in formula I of the present application, R is selected from one or more of Pr, Nd and RH, and RH is selected from one or more of Dy and Tb; the content of R is 28.5% to 32.5%; more specifically, the content of Pr is 0 to 14.5%, the content of Nd is 14% to 32.5%, the content of Tb is 0 to 5.0%, and the content of Dy is 0 to 5.0%; more specifically, the content of Pr is 5% to 10%, the content of Nd is 20% to 25.5%, the content of Dy is 0 to 3%; more specifically, the content of Pr is 5.5, 5.9, 6.0, 6.2, 6.3, 6.4, 7.0, 7.2, 7.9, 8.2, 8.4 or 9.8, the content of Nd is 21.5, 22.6, 23.0, 23.2, 23.5, 23.9, 24.2, 24.8, 25.2 or 25.5, and the content of Dy is 0, 0.6, 1.5, 1.8, 2.5 or 3.0.

M is selected from one or more of Ti, Nb, Hf and Mn; and the content of Ti is 0 to 0.12%, the content of Nb is 0 to 0.29%, the content of Hf is 0 to 1.0%, and the content of Mn is 0 to 1.0%. In the present application, M is configured to refine grains, wet grain boundaries, and improve magnet toughness and process ability, and more specifically, M is selected from one or both of Ti and Nb, the content of Ti is 0 to 0.1%, and the content of Nb is 0 to 0.15%.

A is Cu, Ga, Al and Zr; Zr is configured to form alloy phases of Zr—Cu and Cu—Ga, optimize the grain boundary, wet the grain boundary, greatly improve the coercivity Hcj while the remanence Br remains constant, and form $R_6Fe_{13}A$ compound to improve the coercivity. Specifically, the content of Cu is 0.2% to 0.6%, the content of Ga is 0.25% to 0.55%, the content of Al is 0.02% to 0.6%, and the content of Zr is 0.2% to 0.65%; more specifically, the content of Cu is 0.3% to 0.48%, the content of Ga is 0.35% to 0.5%, the content of Al is 0.1% to 0.5%, and the content of Zr is 0.3% to 0.6%.

T is specifically selected from Fe and Co, the content of Co is 0.3% to 2.5%, the surplus is Fe, and more specifically, the content of Co is 0.5% to 2.0%.

In the present application, the content of B is 0.85% to 1.0%, more specifically, the content of B is 0.90% to 0.98%.

The present application provides a zirconium-containing sintered neodymium iron boron magnet with high-performance. Through the compound addition of zirconium, especially the design of applying a specific single element and to the overall addition amount, the zirconium-rich phase plays a "pinning" effect to optimize the microstructure of the grains, which not only improves the coercivity, but also improves the remanence and the magnetic energy product. If the amount of the added zirconium element is too small, the pinning effect is not obvious; if the amount of the added zirconium element is too much, the volume and thickness of the enriched non-magnetic phase at the grain boundary will increase, which creates isolation between the magnetic phases, weakens the exchange coupling to make the remanence of the alloy reduce and the hardness and processing performance decrease.

The present application also provides a method for preparing the above-mentioned zirconium-containing neodymium iron boron magnet, which includes the following steps:

A) carrying out a strip casting treatment to a raw material of a neodymium iron boron sintered magnet to obtain neodymium iron boron strip casting;

B) carrying out a hydrogen decrepitation and jet milling in sequence to the neodymium iron boron strip casting to obtain neodymium iron boron powder; and C) carrying out an orientation molding and sintering to the neodymium iron boron powder in sequence to obtain the sintered neodymium iron boron magnet.

In the above steps of the present application, the selection principles and preferred ranges of the neodymium iron boron raw material, unless otherwise specified, correspond to the selection principles and preferred ranges of the neodymium iron boron raw material, which will not be repeated here.

In the present application, the neodymium iron boron raw material is firstly subjected to the strip casting process to obtain the neodymium iron boron strip casting.

The source of the neodymium iron boron raw material is not particularly limited in the present application, and the source of conventional magnet raw material well known to those skilled in the art can be used. Those skilled in the art can select and adjust according to factors such as actual production conditions, product requirements and quality control.

The present application has no particular limitations on the specific steps and parameters of the strip casting process, and the steps and parameters of the strip casting process in the preparation process of sintered neodymium iron boron magnets well known to those skilled in the art can be used. Those skilled in the art can select and adjust according to factors such as actual production conditions, product requirements and quality control. The temperature of the strip casting process of the present application is preferably 1450° C. to 1490° C., more preferably 1460° C. to 1480° C. The thickness of the neodymium iron boron strip casting is preferably 0.10 mm to 0.60 mm, more preferably 0.30 mm to 0.40 mm.

In the present application, the neodymium iron boron strip casting obtained in the above steps are sequentially subjected to hydrogenation decrepitation and jet milling to obtain neodymium iron boron powder. The present application does not specifically limit the specific steps of the hydrogen decrepitation, and the steps of the hydrogen decrepitation process in the preparation process of sintered neodymium iron boron magnets well known to those skilled in the art can be used. In the hydrogen decrepitation process of the present application, the hydrogen absorption time is preferably 1 h to 3 h, more preferably 1.5 h to 2.5 h; the hydrogen absorption temperature is preferably 20° C. to 300° C., more preferably 120° C. to 200° C.; the dehydrogenation time is preferably 3 h to 7 h, more preferably 4 h to 5 h; the dehydrogenation temperature is preferably 550° C. to 600° C., more preferably 570° C. to 580° C.

After the hydrogen decrepitation in the present application, the method preferably further includes a water cooling step. The time of the water cooling is preferably 1 h to 3 h, more preferably 1.5 h to 2.5 h.

More preferably, in order to further improve the pulverizing effect of the jet milling, the jet milling is carried out by adding a lubricant to the jet milling. In the present application, the lubricant is not particularly limited, and a magnet jet milling lubricant known to those skilled in the art can be used. The mass ratio of the lubricant of the present application to the mixed fine powder is preferably 0.02% to 0.1%, more preferably 0.05% to 0.08%.

An average particle size after pulverizing according to the present application, that is, the average particle size of the mixed fine powder, is preferably 2 μm to 5 μm, more preferably 3 μm to 4 μm.

In the present application, a neodymium iron boron magnet is obtained after the neodymium iron boron powder obtained in the above steps is sequentially orientation molded and sintered. The present application does not have any particular limitation on the specific steps of the orientation molding, and the specific steps of the magnet orientation molding well known to those skilled in the art can be used. Those skilled in the art can select and adjust according to factors such as actual production conditions, product requirements and quality requirements. The orientation molding of the present application preferably includes the steps of orientation pressing and isostatic pressing, more preferably, the magnetic field orientation molding is carried out in a sealed oxygen-free or low-oxygen glove box, and ensures that the product is oxygen-free or hypoxia.

The magnetic field strength of the orientation pressing in the present application is preferably 1.2 T to 3 T, more preferably 1.6 T to 2.4 T; the time of the orientation pressing is preferably 2 s to 10 s, more preferably 3 s to 9 s. The pressure of the isostatic pressing is preferably 120 MPa to 240 MPa, preferably 160 MPa to 200 MPa; the holding time of the isostatic pressing is preferably 30 s to 120 s, more preferably 70 s to 80 s. In the present application, in order to further ensure and improve the performance of the final magnet product, the density of the magnet blank after orientation pressing is preferably 3.8 g/cm$^3$ to 4.3 g/cm$^3$, more preferably 3.9 g/cm$^3$ to 4.1 g/cm$^3$. The density of the magnet blank after isostatic pressing is preferably 4.5 g/cm$^3$ to 5.0 g/cm$^3$, more preferably 4.6 g/cm$^3$ to 4.9 g/cm$^3$.

According to the present application, the magnet body obtained in the above steps is finally sintered. The present application does not limit the specific steps of the sintering. The specific steps of the magnet sintering well known to those skilled in the art can be used. The sintering in the present application is preferably vacuum sintering; preferably, an aging treatment step is further included after the sintering; and the aging treatment more preferably includes a first aging treatment and a second aging treatment.

The sintering temperature in the present application is preferably 1000° C. to 1200° C., more preferably 1050° C. to 1150° C.; the sintering time is preferably 5 h to 15 h, more preferably 6 h to 10 h. The sintered vacuum bag of the present application is preferably less than or equal to 0.02 Pa, more preferably less than or equal to 0.01 Pa. In order to further ensure and improve the performance of the final magnet product, the density of the sintered magnet blank is preferably 7.4 g/cm$^3$ to 7.7 g/cm$^3$, more preferably 7.5 g/cm$^3$ to 7.65 g/cm$^3$.

The specific steps and parameters of the aging treatment are not particularly limited in the present application, and the specific steps of the magnet aging treatment well known to those skilled in the art can be used. The temperature of the first aging treatment in the present application is preferably 800° C. to 980° C., more preferably 840° C. to 960° C.; the time of the first aging treatment is preferably 2 h to 15 h, more preferably 3 h to 6 h. The temperature of the second aging treatment is preferably 420° C. to 580° C., more preferably 440° C. to 560° C.; and the time of the second aging treatment is preferably 1 h to 6 h, more preferably 3 h to 4 h.

The present application does not specifically limit the overall preparation process of the above magnet, and the preparation process of the sintered neodymium iron boron magnets well known to those skilled in the art can be used, that is, the raw material is formed into a blank after the steps of batching, strip casting process (melting), preparing powder by hydrogen decrepitation, powder orientation pressing and vacuum sintering, and after surface treatment and processing, the blank can be used as a finished neodymium iron boron magnet.

The neodymium iron boron magnet and the method of preparing the same according to the present application can not only prepare a neodymium iron boron magnetic material with high performance, but also can improve the remanence, coercivity and magnetic energy product of the magnet alloy without adding heavy rare earth elements, and the production cost is reduced, and the process is simple, the applicability is wide, and it is suitable for large-scale industrial production.

The experimental results show that the coercivity increase value is greater than 1.0 kOe under the condition that the remanence is not reduced by using the neodymium iron boron magnet provided by the present application compared with the neodymium iron boron magnet of the same type.

For technical solution 2:

The present application provides a titanium-containing sintered neodymium iron boron magnet shown in formula (I);

$$R_x T_{100-x-y1-y2-z} M_{y1} A_{y2} B_z \quad (I);$$

where, x, y1, y2 and z are mass percentages of corresponding elements, $28.5\% \leq x \leq 32.0\%$, $0\% \leq y1 \leq 1.0\%$, $0.60\% \leq y2 \leq 2.30\%$, $0.86\% \leq z \leq 0.98\%$;

R is selected from one or more of Pr, Nd, La, Ce, Dy, Tb and Ho;

M is selected from one or more of Zr, Nb, Hf and Mn, and a content of Zr is 0 to 0.19%, a content of Nb is 0 to 0.29%, a content of Hf is 0 to 1.0%, and a content of Mn is 0 to 1.0%;

A is Cu, Ga, Al and Ti, and a content of Cu is 0.2% to 0.55%, a content of Ga is 0.25% to 0.55%, a content of Al is 0.02% to 0.8%, and a content of Ti is 0.13% to 0.4%; and T is selected from Fe and Co, a content of Co is 0.2% to 2.0%, and surplus is Fe.

The specific definition of the formula I is not particularly limited in the present application, and such expressions well known to those skilled in the art can be used, which can be understood as a mass ratio.

In the general formula described in the formula I of the present application, R is selected from one or more of Pr, Nd, La, Ce, Dy, Tb and Ho; the content of R is 28.5% to 32.0%; more specifically, the content of Pr is 0 to 14.5%, the content of Nd is 14% to 32.5%, the content of Tb is 0 to 4.5%, the content of Dy is 0 to 4.5%; more specifically, the content of Pr is 7% to 9%, and the content of Nd is 20% to 25.5%, the content of Dy is 0 to 3%; more specifically, the content of Pr is 7.0%, 7.2%, 7.5%, 7.8%, 8.0%, 8.2%, 8.5% or 8.8%, the content of Nd is 21.5%, 21.7%, 22.5%, 22.8%, 23.0%, 23.3%, 23.5%, 24.0%, 24.2%, 24.8%, 25.2% or 25.5%, and the content of Dy is 0, 1.8%, 2.5% or 3.0%.

M is selected from one or more of Zr, Nb, Hf and Mn; and the content of Zr is 0 to 0.19%, the content of Nb is 0 to 0.29%, the content of Hf is 0 to 1.0%, and the content of Mn is 0 to 1.0%; in this application, M is configured to refine the grains and improve the toughness and processing performance of the magnet. More specifically, M is selected from one or both of Zr and Nb, the content of Zr is 0 to 0.15%, and the content of Nb is 0 to 0.20%; Zr and Nb may not be added or may be added in trace amounts.

A is Cu, Ga, Al and Ti; the elements in A are configured to form alloy phases of Ti—B, Ti—Cu, Cu—Ga, optimize the grain boundaries, wet the grain boundaries, and greatly increase the coercivity Hcj while the remanence Br remains constant, form R6Fe13A to form antiferromagnetism, which increases the coercivity. Specifically, the content of Cu is 0.2% to 0.55%, the content of Ga is 0.25% to 0.55%, the content of Al is 0.02% to 0.8%, and the content of Ti is 0.13% to 0.4%; more specifically, the content of Cu is 0.2% to 0.5%, the content of Ga is 0.35% to 0.45%, the content of Al is 0.1% to 0.45%, and the content of Ti is 0.2% to 0.35%; more specifically, the content of Cu is 0.2%, 0.25%, 0.28%, 0.30%, 0.32% %, 0.35%, 0.40% or 0.45%, the content of Ga is 0.35%, 0.38%, 0.40%, 0.42% or 0.45%, the content of Al is 0.1%, 0.18%, 0.19%, 0.20%, 0.22%, 0.26%, 0.30%, 0.32%, 0.35%, 0.40%, 0.45% or 0.48%, the content of Ti is 0.2%, 0.22%, 0.25%, 0.28%, 0.30%, 0.32%, 0.33%, 0.35%, 0.40%, 0.42%, 0.45%, 0.48%, or 0.5%.

T is specifically selected from Fe and Co, the content of Co is 0.2% to 2.0%, the surplus is Fe, and more specifically, the content of Co is 0.5% to 1.5%.

In the present application, the content of B is 0.86% to 0.98%, more specifically, the content of B is 0.90% to 0.98%.

The present application provides a titanium-containing sintered neodymium iron boron magnet with high-performance. Through the compound addition of titanium, especially the design of applying a specific single element and to the overall addition amount, the titanium-rich phase plays a "pinning" effect to optimize the microstructure of the grains, which not only improves the coercivity, but also improves the remanence and the magnetic energy product. Meanwhile, a Ti—B alloy is formed, which optimize the grain boundary, and improve the coercivity greatly. If the added titanium element is too small, the pinning effect is not obvious; if the added amount of titanium element is too large, the volume and thickness of the enriched non-magnetic phase at the grain boundary will increase, which creates isolation between the magnetic phases, and weakens the exchange coupling to make the remanence of the alloy reduce and the hardness and processing performance decrease.

The present application also provides a method for preparing the above-mentioned titanium-containing neodymium iron boron magnet, which includes the following steps:

A) carrying out a strip casting treatment a raw material of a neodymium iron boron sintered magnet to obtain neodymium iron boron strip casting;

B) carrying out hydrogen decrepitation and jet milling in sequence to the neodymium iron boron strip casting to obtain neodymium iron boron powder; and C) carrying out an orientation molding and sintering to the neodymium iron boron powder in sequence to obtain the neodymium iron boron magnet.

In the above steps of the present application, unless otherwise specified, the selection principles and preferred ranges of the neodymium iron boron raw material correspond to the selection principles and preferred ranges of the neodymium iron boron raw material, which will not be repeated here.

In the present application, the neodymium iron boron raw material is firstly subjected to the strip casting process to obtain the neodymium iron boron strip casting.

The source of the neodymium iron boron raw material is not particularly limited in the present application, and the source of conventional magnet raw material well known to those skilled in the art can be used. Those skilled in the art can select and adjust according to factors such as actual production conditions, product requirements and quality control.

The present application has no particular limitations on the specific steps and parameters of the strip casting process, and the steps and parameters of the strip casting process in the preparation process of sintered neodymium iron boron magnets well known to those skilled in the art can be used. Those skilled in the art can select and adjust according to factors such as actual production conditions, product requirements and quality control. The temperature of the strip casting process of the present application is preferably 1450° C. to 1490° C., more preferably 1455° C. to 1485° C., more preferably 1460° C. to 1480° C., more preferably 1465° C. to 1475° C. The thickness of the neodymium iron boron strip casting is preferably 0.10 mm to 0.60 mm, more preferably 0.20 mm to 0.50 mm, and more preferably 0.25 mm to 0.35 mm.

In the present application, the neodymium iron boron strip casting obtained in the above steps are sequentially subjected to hydrogen decrepitation and jet milling to obtain neodymium iron boron powder. The present application does not specifically limit the specific steps of the hydrogen decrepitation, and the steps of the hydrogen decrepitation process in the preparation process of sintered neodymium iron boron magnets well known to those skilled in the art can be used. In the hydrogen decrepitation process of the present application, the hydrogen absorption time is preferably 1 h to 3 h, more preferably 1.2 h to 2.8 h, more preferably 1.5 h to 2.5 h; the hydrogen absorption temperature is preferably 20° C. to 300° C., more preferably 70° C. to 250° C., more preferably 120° C. to 200° C.; the dehydrogenation time is preferably 3 h to 7 h, more preferably 3.5 h to 6.5 h, more preferably 4 h to 5 h; and the dehydrogenation temperature is preferably 550° C. to 600° C., more preferably 560° C. to 590° C., more preferably 570° C. to 580° C.

After the hydrogen decrepitation in the present application, the method preferably further includes a water cooling step. The time of the water cooling is preferably 1 h to 3 h, more preferably 1.2 h to 2.8 h, more preferably 1.5 h to 2.5 h.

More preferably, in order to further improve the pulverizing effect of the jet milling, the jet milling is carried out by adding a lubricant to the jet milling. In the present application, the lubricant is not particularly limited, and a magnet jet milling lubricant known to those skilled in the art can be used. The mass ratio of the lubricant of the present application to the mixed fine powder is preferably 0.02% to 0.1%, more preferably 0.03% to 0.09%, more preferably 0.05% to 0.08%.

An average particle size after pulverizing according to the present application, that is, the average particle size of the mixed fine powder, is preferably 2 μm to 5 μm, more preferably 2.5 μm to 4.5 μm, more preferably 3 μm to 4 μm.

In the present application, a neodymium iron boron magnet is obtained after the neodymium iron boron powder obtained in the above steps is sequentially orientation molded and sintered. The present application does not have any particular limitation on the specific steps of the orientation molding, and the specific steps of the magnet orientation molding well known to those skilled in the art can be used. Those skilled in the art can select and adjust according to factors such as actual production conditions, product requirements and quality requirements. The orientation molding of the present application preferably includes the steps of orientation pressing and isostatic pressing, more preferably, the magnetic field orientation molding is carried out in a sealed oxygen-free or low-oxygen glove box, and ensures that the product is oxygen-free or hypoxia.

The magnetic field strength of the orientation pressing in the present application is preferably 1.2 T to 3 T, more preferably 1.7 T to 2.5 T, and more preferably 1.6 T to 2.4 T; the time of the orientation pressing is preferably 2 s to 10 s, more preferably 3 s to 9 s, and more preferably 5 s to 7 s. The pressure of the isostatic pressing is preferably 120 MPa to 240 MPa, more preferably 150 MPa to 210 Mpa, and more preferably 160 MPa to 200 MPa; the holding time of the isostatic pressing is preferably 30 s to 120 s, more preferably 50 s to 100 s, and more preferably 70 s to 80 s. In the present application, in order to further ensure and improve the performance of the final magnet product, the density of the magnet blank after orientation pressing is preferably 3.8 g/cm$^3$ to 4.3 g/cm$^3$, more preferably 3.9 g/cm$^3$ to 4.2 g/cm$^3$, and more preferably 4.0 g/cm$^3$ to 4.1 g/cm$^3$. The density of the magnet blank after isostatic pressing is preferably 4.5 g/cm$^3$ to 5.0 g/cm$^3$, more preferably 4.6 g/cm$^3$ to 4.9 g/cm$^3$, and more preferably 4.7 g/cm$^3$ to 4.8 g/cm$^3$.

According to the present application, the magnet body obtained in the above steps is finally sintered. The present application does not limit the specific steps of the sintering. The specific steps of the magnet sintering well known to those skilled in the art can be used. The sintering in the present application is preferably vacuum sintering; preferably, an aging treatment step is further included after the sintering; and the aging treatment more preferably includes a first aging treatment and a second aging treatment.

The sintering temperature in the present application is preferably 1000° C. to 1200° C., more preferably 1025° C. to 1175° C., and more preferably 1040° C. to 1150° C.; the sintering time is preferably 5 h to 15 h, more preferably 7 h to 13 h, and more preferably 8 h to 10 h. The sintered vacuum bag of the present application is preferably less than or equal to 0.02 Pa, more preferably less than or equal to 0.015 Pa, and more preferably less than or equal to 0.01 Pa. In order to further ensure and improve the performance of the final magnet product, the density of the sintered magnet blank is preferably 7.4 g/cm$^3$ to 7.7 g/cm$^3$, more preferably 7.45 g/cm$^3$ to 7.65 g/cm$^3$, and more preferably 7.5 g/cm$^3$ to 7.6 g/cm$^3$.

The specific steps and parameters of the aging treatment are not particularly limited in the present application, and the specific steps of the magnet aging treatment well known to those skilled in the art can be used. The temperature of the first aging treatment in the present application is preferably 800° C. to 980° C., more preferably 820° C. to 960° C.; the time of the first aging treatment is preferably 1 h to 10 h, more preferably 2 h to 8 h. The temperature of the second aging treatment is preferably 420° C. to 580° C., more preferably 440° C. to 560° C.; and the time of the second aging treatment is preferably 1 h to 8 h, more preferably 2 h to 7 h.

The present application does not specifically limit the overall preparation process of the above magnet, and the preparation process of the sintered neodymium iron boron magnets well known to those skilled in the art can be used, that is, the raw material is formed into a blank after the steps of batching, strip casting process (melting), preparing powder by hydrogen decrepitation, powder orientation pressing and vacuum sintering, and after surface treatment and processing, the blank can be used as a finished neodymium iron boron magnet.

The neodymium iron boron magnet and the method of preparing the same according to the present application can not only prepare a neodymium iron boron magnetic material with high performance, but also can improve the remanence, coercivity and magnetic energy product of the magnet alloy without adding heavy rare earth elements, and the production cost is reduced, the process is simple, the applicability is wide, and it is suitable for large-scale industrial production.

The experimental results show that the coercivity increase value is greater than 1.3 kOe under the condition that the remanence is not reduced by using the g neodymium iron boron magnet provided by the present application compared with the neodymium iron boron magnet of the same type.

For technical solution 3:

The present application provides a Nb-containing sintered neodymium iron boron magnet as shown in formula (I);

$$R_xT_{100-x-y1-y2-z}M_{y1}A_{y2}B_z \quad (I);$$

where, x, y1, y2 and z are mass percentages of corresponding elements, 28.7%≤x≤32.8%, 0%≤y1≤1.0%, 0.77%≤y2≤2.60%, 0.86%≤z≤1.01%;

R is selected from one or more of Pr, Nd, Dy and Tb;

M is selected from one or more of Ti, Zr, Hf and Mn, and the content of Zr is 0 to 0.19%, the content of Ti is 0 to 0.12%, the content of Hf is 0 to 1.0%, and the content of Mn is 0 to 1.0%;

A is Cu, Ga, Al and Nb, and the content of Cu is 0.2% to 0.55%, the content of Ga is 0.25% to 0.55%, the content of Al is 0.02% to 0.7%, and the content of Nb is 0.3% to 0.8%; and T is selected from Fe and Co, the content of Co is 0.4% to 2.3%, and surplus is Fe.

The specific definition of the formula I is not particularly limited in the present application, and such expressions well known to those skilled in the art can be used, which can be understood as a mass ratio.

In the general formula described in Formula I of the present application, R is selected from one or more of Pr, Nd and RH, and RH is selected from one or more of Dy and Tb; the content of R is 29.0% to 32.0%; more specifically, the content of Pr is 0 to 14.5%, the content of Nd is 14.5% to 32%, the content of Tb is 0 to 4.3%, and the content of Dy is 0 to 4.3%; more specifically, the content of Pr is 5% to 10%, the content of Nd is 20% to 26%, the content of Dy is 1.5% to 3%; more specifically, the content of Pr is 6.0, 6.1, 6.2, 6.3, 6.9, 7.4, 7.7, 7.9, 8.1, 8.4, 8.7 or 9.0, the content of Nd is 22.7, 23.0, 23.6, 23.9, 24.2, 24.8, 25.4 or 25.9, and the content of Dy is 0, 1.8, 2.8 or 3.0.

M is selected from one or more of Ti, Zr, Hf and Mn; and the content of Zr is 0 to 0.19%, the content of Ti is 0 to 0.12%, the content of Hf is 0 to 1.0%, and the content of Mn is 0 to 1.0%; in the present application, M is configured to refine the grains and improve the toughness and processing performance of the magnet. More specifically, M is selected from one or both of Zr and Ti, the content of Zr is 0 to 0.15%, and the content of Ti is 0 to 0.10%. It should be noted here that the roles of Zr and Ti are different from the previous one.

A is Cu, Ga, Al and Nb; A is configured to form alloy phases of Nb—B, Cu—Ga, optimize the grain boundaries, wet the grain boundaries, and greatly increase the coercivity Hcj while the remanence Br remains constant, form R6Fe13A to form antiferromagnetism, which increases the coercivity. Specifically, the content of Cu is 0.2% to 0.55%, the content of Ga is 0.25% to 0.55%, the content of Al is 0.02% to 0.7%, and the content of Nb is 0.3% to 0.8%; more specifically, the content of Cu is 0.25% to 0.45% %, the content of Ga is 0.30% to 0.45%, the content of Al is 0.1% to 0.4%, and the content of Nb is 0.4% to 0.55%; more specifically, the content of Cu is 0.2%, 0.25%, 0.28%, 0.30%, 0.32% %, 0.35%, 0.40% or 0.45%, the content of Ga is 0.30%, 0.32%, 0.35%, 0.38%, 0.40%, 0.42% or 0.45%, the content of Al is 0.1%, 0.18%, 0.19%, 0.20%, 0.22%, 0.26%, 0.30%, 0.32%, 0.35% or 0.40%, and the content of Nb is 0.40%, 0.42%, 0.45%, 0.48%, 0.50%, 0.52% or 0.55%.

T is specifically selected from Fe and Co, the content of Co is 0.4% to 2.3%, the surplus is Fe, and more specifically, the content of Co is 0.5% to 1.5%.

In the present application, the content of B is 0.86% to 1.01%, more specifically, the content of B is 0.90% to 0.96%.

The present application provides a niobium-containing sintered neodymium iron boron magnet with high-performance. Through the compound addition of niobium, especially the design of applying a specific single element and to the overall addition amount, Nb—B phase is formed, so that the niobium and boron-rich phase plays a "pinning" effect to optimize the microstructure of the grains, which not only improves the coercivity, but also improves the remanence and the magnetic energy product. If the added amount of niobium element is too small, the pinning effect is not obvious; if the added amount of niobium element is too large, the volume and thickness of the enriched non-magnetic phase at the grain boundary will increase, which creates isolation between the magnetic phases, and weakens the exchange coupling to make the remanence of the alloy reduce and the hardness and processing performance decrease.

The present application also provides a method for preparing the above-mentioned neodymium iron boron magnet, which includes the following steps:

A) carrying out a strip casting treatment a raw material of a neodymium iron boron sintered magnet to obtain neodymium iron boron strip casting;

B) carrying out hydrogen decrepitation and jet milling in sequence to the neodymium iron boron strip casting to obtain neodymium iron boron powder; and C) carrying out an orientation molding and sintering to the neodymium iron boron powder in sequence to obtain the neodymium iron boron magnet.

In the above steps of the present application, unless otherwise specified, the selection principles and preferred ranges of the neodymium iron boron raw material, correspond to the selection principles and preferred ranges of the neodymium iron boron raw material, which will not be repeated here.

In the present application, the neodymium iron boron raw material is firstly subjected to the strip casting process to obtain the neodymium iron boron strip casting.

The source of the neodymium iron boron raw material is not particularly limited in the present application, and the source of conventional magnet raw material well known to those skilled in the art can be used. Those skilled in the art can select and adjust according to factors such as actual production conditions, product requirements and quality control.

The present application has no particular limitations on the specific steps and parameters of the strip casting process, and the steps and parameters of the strip casting process in the preparation process of sintered neodymium iron boron magnets well known to those skilled in the art can be used. Those skilled in the art can select and adjust according to factors such as actual production conditions, product requirements and quality control. The temperature of the strip casting process of the present application is preferably 1450° C. to 1490° C., more preferably 1460° C. to 1480° C. The thickness of the neodymium iron boron strip casting is preferably 0.10 mm to 0.60 mm, more preferably 0.20 mm to 0.40 mm.

In the present application, the neodymium iron boron strip casting obtained in the above steps are sequentially subjected to hydrogen decrepitation and jet milling to obtain neodymium iron boron powder. The present application does not specifically limit the specific steps of the hydrogen decrepitation, and the steps of the hydrogen decrepitation process in the preparation process of sintered neodymium iron boron magnets well known to those skilled in the art can be used. In the hydrogen decrepitation process of the present application, the hydrogen absorption time is preferably 1 h to 3 h, more preferably 1.5 h to 2.5 h; the hydrogen absorption temperature is preferably 20° C. to 300° C., more preferably 120° C. to 200° C.; the dehydrogenation time is preferably 3 h to 7 h, more preferably 3.5 h to 6.5 h, and more preferably 4 h to 5 h; the dehydrogenation temperature is preferably 550° C. to 600° C., more preferably 570° C. to 590° C.

After the hydrogen decrepitation in the present application, the method preferably to further includes a water cooling step. The time of the water cooling is preferably 1 h to 3 h, more preferably 1.5 h to 2.5 h.

More preferably, in order to further improve the pulverizing effect of the jet milling, the jet milling is more carried out by adding a lubricant to the jet milling. In the present application, the lubricant is not particularly limited, and a magnet jet milling lubricant known to those skilled in the art can be used. The mass ratio of the lubricant of the present application to the mixed fine powder is preferably 0.02% to 0.1%, more preferably 0.03% to 0.09%.

An average particle size after pulverizing according to the present application, that is, the average particle size of the mixed fine powder, is preferably 2 μm to 5 μm, more preferably 3 μm to 4 μm.

In the present application, a neodymium iron boron magnet is obtained after the neodymium iron boron powder obtained in the above steps is sequentially orientation molded and sintered. The present application does not have any particular limitation on the specific steps of the orientation molding, and the specific steps of the magnet orientation molding well known to those skilled in the art can be used. Those skilled in the art can select and adjust according to factors such as actual production conditions, product requirements and quality requirements. The orientation molding of the present application preferably includes the steps of orientation pressing and isostatic pressing, more preferably, the magnetic field orientation molding is carried out in a sealed oxygen-free or low-oxygen glove box, and ensures that the product is oxygen-free or hypoxia.

The magnetic field strength of the orientation pressing in the present application is preferably 1.2 T to 3 T, more preferably 1.7 T to 2.5 T; the time of the orientation pressing is preferably 2 s to 10 s, more preferably 5 s to 8 s. The pressure of the isostatic pressing is preferably 120 MPa to 240 MPa, preferably 160 MPa to 200 MPa; the holding time of the isostatic pressing is preferably 30 s to 120 s, more preferably 50 s to 100 s, and more preferably 70 s to 80 s. In the present application, in order to further ensure and improve the performance of the final magnet product, the density of the magnet blank after orientation pressing is preferably 3.8 g/cm$^3$ to 4.3 g/cm$^3$, more preferably 4.0 g/cm$^3$ to 4.2 g/cm$^3$. The density of the magnet blank after isostatic pressing is preferably 4.5 g/cm$^3$ to 5.0 g/cm$^3$, more preferably 4.6 g/cm$^3$ to 4.8 g/cm$^3$.

According to the present application, the magnet body obtained in the above steps is finally sintered. The present application does not limit the specific steps of the sintering. The specific steps of the magnet sintering well known to those skilled in the art can be used. The sintering in the present application is preferably vacuum sintering; preferably, an aging treatment step is further included after the sintering; and the aging treatment more preferably includes a first aging treatment and a second aging treatment.

The sintering temperature in the present application is preferably 1000° C. to 1200° C., more preferably 1050° C. to 1150° C.; the sintering time is preferably 5 h to 15 h, more preferably 7 h to 13 h. The sintered vacuum bag of the present application is preferably less than or equal to 0.02 Pa, more preferably less than or equal to 0.015 Pa. In order to further ensure and improve the performance of the final magnet product, the density of the sintered magnet blank is preferably 7.4 g/cm$^3$ to 7.7 g/cm$^3$, more preferably 7.45 g/cm$^3$ to 7.65 g/cm$^3$.

The specific steps and parameters of the aging treatment are not particularly limited in the present application, and the specific steps of the magnet aging treatment well known to those skilled in the art can be used. The temperature of the first aging treatment in the present application is preferably 800° C. to 950° C., more preferably 820° C. to 930° C.; the time of the first aging treatment is preferably 2 h to 15 h, more preferably 5 h to 10 h. The temperature of the second aging treatment is preferably 420° C. to 580° C., more preferably 435° C. to 565° C.; and the time of the second aging treatment is preferably 1 h to 8 h, more preferably 2 h to 7 h.

The present application does not specifically limit the overall preparation process of the above magnet, and the preparation process of the sintered neodymium iron boron magnets well known to those skilled in the art can be used, that is, the raw material is formed into a blank after the steps of batching, strip casting process (melting), preparing powder by hydrogen decrepitation, powder orientation pressing and vacuum sintering, and after surface treatment and processing, the blank can be used as a finished neodymium iron boron magnet.

The neodymium iron boron magnet and the method of preparing the same according to the present application can not only prepare a neodymium iron boron magnetic material with high performance, but also can improve the remanence, coercivity and magnetic energy product of the magnet alloy without adding heavy rare earth elements, and the production cost is reduced, the process is simple, the applicability is wide, and it is suitable for large-scale industrial production.

The experimental results show that the coercivity increase value is greater than 1.0 kOe under the condition that the remanence is not reduced by using the g neodymium iron boron magnet provided by the present application compared with the neodymium iron boron magnet of the same type.

In order to further understand the present application, the neodymium iron boron and the method of preparing the same provided by the present application will be described in detail below with reference to the examples, and the protection scope of the present application is not limited by the following examples.

TABLE 1

Raw material formula data table of examples (unit of number in the table is wt %)

| Number | Pr | Nd | Dy | Tb | B | Cu | Co | Ga | Al | Zr | Ti | Nb | Fe |
|---|---|---|---|---|---|---|---|---|---|---|---|---|---|
| Example 1 | 6.1 | 23.9 | 0 | 0 | 0.96 | 0.2 | 0.5 | 0.25 | 0.1 | 0.2 | 0 | 0.1 | Surplus |
| Comparative example 1a | 6.1 | 23.9 | 0 | 0 | 0.96 | 0.1 | 0.5 | 0.1 | 0.1 | 0.2 | 0 | 0.1 | Surplus |
| Comparative example 1b | 6.1 | 23.9 | 0 | 0 | 0.96 | 0.2 | 0.5 | 0.25 | 0.1 | 0 | 0 | 0.1 | Surplus |
| Example 2 | 6.2 | 24.2 | 0 | 0 | 0.96 | 0.3 | 0.5 | 0.35 | 0.45 | 0.3 | 0 | 0 | Surplus |
| Comparative example 2 | 6.2 | 24.2 | 0 | 0 | 0.96 | 0.3 | 0.5 | 0.35 | 1.0 | 0.1 | 0 | 0 | Surplus |
| Example 3 | 6.3 | 24.8 | 0 | 0 | 0.95 | 0.4 | 0.5 | 0.45 | 0.3 | 0.4 | 0 | 0 | Surplus |
| Comparative example 3a | 6.3 | 24.8 | 0 | 0 | 0.95 | 0.75 | 0.5 | 0.45 | 0.3 | 0.4 | 0 | 0 | Surplus |
| Comparative example 3b | 6.3 | 24.8 | 0 | 0 | 0.95 | 0.4 | 0.5 | 0.6 | 0.3 | 0.4 | 0 | 0 | Surplus |
| Comparative example 3c | 6.3 | 24.8 | 0 | 0 | 0.95 | 0.4 | 0.5 | 0.45 | 1.0 | 0.4 | 0 | 0 | Surplus |
| Example 4 | 6.4 | 25.4 | 0 | 0 | 0.92 | 0.5 | 0.5 | 0.45 | 0.4 | 0.5 | 0.1 | 0.15 | Surplus |
| Comparative example 4 | 6.4 | 25.4 | 0 | 0 | 0.92 | 0.1 | 0.5 | 0.1 | 0.4 | 0.7 | 0.1 | 0.15 | Surplus |
| Example 5 | 5.9 | 23 | 3 | 0 | 0.92 | 0.6 | 0.5 | 0.48 | 0.5 | 0.6 | 0 | 0 | Surplus |
| Comparative example 5 | 5.9 | 23 | 3 | 0 | 0.92 | 0.6 | 0.5 | 0.48 | 0.5 | 0.75 | 0 | 0 | Surplus |
| Example 6 | 6.1 | 23.9 | 0 | 0 | 0.96 | 0.2 | 0.5 | 0.25 | 0.1 | 0.3 | 0 | 0.1 | Surplus |
| Example 7 | 6.1 | 23.9 | 0 | 0 | 0.96 | 0.2 | 0.5 | 0.25 | 0.1 | 0.4 | 0 | 0.1 | Surplus |
| Example 8 | 6.1 | 23.9 | 0 | 0 | 0.96 | 0.2 | 0.5 | 0.25 | 0.1 | 0.5 | 0 | 0.1 | Surplus |
| Example 9 | 6.1 | 23.9 | 0 | 0 | 0.96 | 0.2 | 0.5 | 0.25 | 0.1 | 0.6 | 0 | 0.1 | Surplus |

Example 1

The ingredients are prepared according to example 1 shown in Table 1, the obtained raw materials are smelted in a vacuum induction melting furnace, the obtained melt is cast at 1460° C., and cooled on a copper roll with a rotational speed of 40 rpm to obtain a neodymium iron boron alloy casting sheet with an average thickness of 0.30 mm. The casting sheet is subjected to hydrogen decrepitation, the hydrogen absorption time in the hydrogen decrepitation process is 1 h, the dehydrogenation time is 5 h, the dehydrogenation temperature is 580° C., and the cooling time is 2 h. The obtained powder is subjected to jet milling to obtain a powder with a particle size of 3.8 μm. The obtained powder is subjected to magnetic field orientation molding treatment under a magnetic field of 17320 Gauss in a sealed oxygen-free glove box, and then subjected to isostatic pressing treatment under 200 MPa to obtain a magnet blank. The magnet blank is sintered at 1060° C. for 6 h, then aged at 910° C. for 2 h, and finally aged at 515° C. for 4 h to obtain a neodymium iron boron magnet.

Comparative example 1 is prepared by the same procedure.

The neodymium iron boron magnet prepared by the above method of the present application and the neodymium iron boron magnet prepared in comparative example 1 are compared in parallel tests. The comparison results are shown in Table 2. Table 2 is the performance data table of the magnets prepared in the examples and the comparative examples.

TABLE 2

Performance data table of magnets prepared in examples and comparative examples

| Sample label | Br (kGs) | Hcj (kOe) | Hk/Hcj (%) |
|---|---|---|---|
| Example 1 | 14.59 | 15.8 | 0.98 |
| Comparative example 1a | 14.52 | 14.71 | 0.98 |
| Comparative example 1b | 14.54 | 13.66 | 0.97 |

It can be seen from Table 1 and Table 2 that in example 1 and comparative example 1a, Zr is the same, and Cu and Ga are less than the range, the coercivity is different by 1.09 kOe; and in comparative example 1b, when Zr is not added, the coercivity is different by 1.05 kOe.

Example 2

The ingredients are prepared according to example 2 shown in Table 1, the obtained raw materials are smelted in a vacuum induction melting furnace, the obtained melt is cast at 1450° C., and cooled on a copper roll with a rotational speed of 40 rpm to obtain a neodymium iron boron alloy casting sheet with an average thickness of 0.28 mm. The casting sheet is subjected to hydrogen decrepitation, the hydrogen absorption time in the hydrogen decrepitation process is 1 h, the dehydrogenation time is 5 h, the dehydrogenation temperature is 580° C., and the cooling time is 2 h. The obtained powder is subjected to jet milling to obtain a powder with a particle size of 3.8 μm. The obtained powder is subjected to magnetic field orientation molding treatment under a magnetic field of 17500 Gauss in a sealed oxygen-free glove box, and then subjected to isostatic pressing treatment under 200 MPa to obtain a magnet blank. The magnet blank is sintered at 1070° C. for 6 h, then aged at 910° C. for 2 h, and finally aged at 515° C. for 4 h to obtain a neodymium iron boron magnet.

Comparative example 2 is prepared by the same procedure.

The neodymium iron boron magnet prepared by the above method of the present application and the ordinary neodymium iron boron magnet are compared in parallel tests. The comparison results are shown in Table 3. Table 3 is the performance data table of the magnets prepared in the examples and the comparative examples.

TABLE 3

Performance data table of magnets prepared
in examples and comparative examples

| Sample label | Br (kGs) | Hcj (kOe) | Hk/Hcj (%) |
|---|---|---|---|
| Example 2 | 14.26 | 18.48 | 0.98 |
| Comparative example 2 | 14.21 | 16.93 | 0.98 |

It can be seen from Table 1 and Table 3 that in example 2 and comparative example 2, Al is greater than the range, Zr is less than the range, and the coercivity is different by 1.58 kOe.

Example 3

The ingredients are prepared according to example 3 shown in Table 1, the obtained raw materials are smelted in a vacuum induction melting furnace, the obtained melt is cast at 1440° C., and cooled on a copper roll with a rotational speed of 40 rpm to obtain a neodymium iron boron alloy casting sheet with an average thickness of 0.32 mm. The casting sheet is subjected to hydrogen decrepitation, the hydrogen absorption time in the hydrogen decrepitation process is 1 h, the dehydrogenation time is 5 h, the dehydrogenation temperature is 580° C., and the cooling time is 2 h. The obtained powder is subjected to jet milling to obtain a powder with a particle size of 3.8 μm. The obtained powder is subjected to magnetic field orientation molding treatment under a magnetic field of 17560 Gauss in a sealed oxygen-free glove box, and then subjected to isostatic pressing treatment under 200 MPa to obtain a magnet blank. The magnet blank is sintered at 1080° C. for 6 h, then aged at 900° C. for 2 h, and finally aged at 515° C. for 4 h to obtain a neodymium iron boron magnet.

Comparative example 3 is prepared by the same procedure.

The neodymium iron boron magnet prepared by the above method of the present application and the ordinary neodymium iron boron magnet are compared in parallel tests. The comparison results are shown in Table 4. Table 4 is the performance data table of the magnets prepared in the examples and the comparative examples.

TABLE 4

Performance data table of magnets prepared
in examples and comparative examples

| Sample label | Br (kGs) | Hcj (kOe) | Hk/Hcj (%) |
|---|---|---|---|
| Example 3 | 13.92 | 20.87 | 0.97 |
| Comparative example 3a | 13.91 | 19.77 | 0.97 |
| Comparative example 3b | 13.92 | 19.86 | 0.98 |
| Comparative example 3c | 13.91 | 20.01 | 0.98 |

It can be seen from Table 1 and Table 4 that in example 3 and comparative example 3a, Zr is the same, Cu is greater than the range, and the coercivity is different by 0.10 kOe; in example 3 and comparative example 3b, Zr is the same, Ga is greater than the range, and the coercivity is different by 1.01 kOe; in example 3 and comparative example 3c, Zr is the same, Al is greater than the range, and the coercivity is different by 0.86 kOe.

Example 4

The ingredients are prepared according to example 4 shown in Table 1, the obtained raw materials are smelted in a vacuum induction melting furnace, the obtained melt is cast at 1455° C., and cooled on a copper roll with a rotational speed of 40 rpm to obtain a neodymium iron boron alloy casting sheet with an average thickness of 0.26 mm. The casting sheet is subjected to hydrogen decrepitation, the hydrogen absorption time in the hydrogen decrepitation process is 1 h, the dehydrogenation time is 5 h, the dehydrogenation temperature is 580° C., and the cooling time is 2 h. The obtained powder is subjected to jet milling to obtain a powder with a particle size of 3.8 μm. The obtained powder is subjected to magnetic field orientation molding treatment under a magnetic field of 17700 Gauss in a sealed oxygen-free glove box, and then subjected to isostatic pressing treatment under 200 MPa to obtain a magnet blank. The magnet blank is sintered at 1090° C. for 6 h, then aged at 910° C. for 2 h, and finally aged at 505° C. for 4 h to obtain a neodymium iron boron magnet.

Comparative example 4 is prepared by the same procedure.

The neodymium iron boron magnet prepared by the above method of the present application and the ordinary neodymium iron boron magnet are compared in parallel tests. The comparison results are shown in Table 5. Table 5 is the performance data table of the magnets prepared in the examples and the comparative examples.

TABLE 5

Performance data table of magnets prepared
in examples and comparative examples

| Sample label | Br (kGs) | Hcj (kOe) | Hk/Hcj (%) |
|---|---|---|---|
| Example 4 | 13.53 | 22.18 | 0.98 |
| Comparative example 4 | 13.52 | 20.87 | 0.98 |

It can be seen from Table 1 and Table 5 that in example 4 and comparative example 4, Zr is greater than the range, Cu and Ga are less than the range, and the coercivity is different by 1.31 kOe.

Example 5

The ingredients are prepared according to example 5 shown in Table 1, the obtained raw materials are smelted in a vacuum induction melting furnace, the obtained melt is cast at 1465° C., and cooled on a copper roll with a rotational speed of 40 rpm to obtain a neodymium iron boron alloy casting sheet with an average thickness of 0.28 mm. The casting sheet is subjected to hydrogen decrepitation, the hydrogen absorption time in the hydrogen decrepitation process is 1 h, the dehydrogenation time is 5 h, the dehydrogenation temperature is 580° C., and the cooling time is 2 h. The obtained powder is subjected to jet milling to obtain a powder with a particle size of 3.8 μm. The obtained powder is subjected to magnetic field orientation molding treatment under a magnetic field of 17500 Gauss in a sealed oxygen-free glove box, and then subjected to isostatic pressing treatment under 200 MPa to obtain a magnet blank. The magnet blank is sintered at 1100° C. for 6 h, then aged at 920° C. for 2 h, and finally aged at 535° C. for 4 h to obtain a neodymium iron boron magnet.

Comparative example 5 is prepared by the same procedure.

The neodymium iron boron magnet prepared by the above method of the present application and the ordinary neodymium iron boron magnet are compared in parallel tests. The comparison results are shown in Table 6. Table 6 is the performance data table of the magnets prepared in the examples and the comparative examples.

TABLE 6

Performance data table of magnets prepared in examples and comparative examples

| Sample label | Br (kGs) | Hcj (kOe) | Hk/Hcj (%) |
|---|---|---|---|
| Example 5 | 12.79 | 27.01 | 0.96 |
| Comparative example 5 | 12.78 | 25.25 | 0.96 |

It can be seen from Table 1 and Table 6 that in example 5 and comparative example 5, Zr is greater than the range, and the coercivity is different by 1.76 kOe.

The preparation method of examples 6 to 9 is identical with that of example 1, and the difference is only in the content of Zr, specifically as shown in Table 1.

The performance of the neodymium iron boron magnets prepared by the above method of the present application is tested, and the comparison results are shown in Table 7. Table 7 is the performance data table of the magnets prepared in the examples and the comparative examples.

TABLE 7

Performance data table of magnets prepared in examples 6 to 9

| Sample label | Br (kGs) | Hcj (kOe) | Hk/Hcj (%) |
|---|---|---|---|
| Example 6 | 14.57 | 16.23 | 0.97 |
| Example 7 | 14.58 | 16.68 | 0.98 |
| Example 8 | 14.59 | 16.55 | 0.99 |
| Example 9 | 15.58 | 16.36 | 0.98 | hydrogen absorption time in the hydrogen decrepitation process is 1 h, the dehydrogenation time is 5 h, the dehydrogenation temperature is 600° C., and the cooling time is 2 h. The obtained powder is subjected to jet milling to obtain a powder with a particle size of 3.4 μm. The obtained powder is subjected to magnetic field orientation molding treatment under a magnetic field of 17320 Gauss in a sealed oxygen-free glove box, and then subjected to isostatic pressing treatment under 200 MPa to obtain a magnet blank. The magnet blank is sintered at 1070° C. for 6 h, then aged at 910° C. for 2 h, and finally aged at 525° C. for 5 h to obtain a neodymium iron boron magnet.

Comparative examples 10a and 10b are prepared by the same procedure.

The neodymium iron boron magnet prepared by the above method of the present application and the neodymium iron boron magnet prepared by the comparative example 10 are compared in parallel tests. The comparison results are shown in Table 9. Table 9 is the performance data table of the magnets prepared in the examples and the comparative examples.

TABLE 9

Performance data table of magnets prepared in examples and comparative examples

| Sample label | Br (kGs) | Hcj (kOe) | Hk/Hcj |
|---|---|---|---|
| Example 10 | 14.52 | 16.23 | 0.98 |
| Comparative example 10a | 14.5 | 14.82 | 0.98 |
| Comparative example 10b | 14.51 | 13.62 | 0.98 |

It can be seen from Table 8 and Table 9 that in example 10 and comparative example 10a, Ti is the same, Cu and Ga are less than the range, and the coercivity is different by 1.41

TABLE 8

Raw material formula data table of examples (unit of number in the table is wt %)

| Number | Pr | Nd | Dy | Tb | B | Cu | Co | Ga | Al | Zr | Ti | Nb | Fe |
|---|---|---|---|---|---|---|---|---|---|---|---|---|---|
| Example 10 | 7.5 | 22.5 | 0 | 0 | 0.98 | 0.2 | 0.5 | 0.25 | 0.1 | 0 | 0.2 | 0 | Surplus |
| Comparative example10a | 7.5 | 22.5 | 0 | 0 | 0.98 | 0.1 | 0.5 | 0.1 | 0.1 | 0 | 0.2 | 0 | Surplus |
| Comparative example10b | 7.5 | 22.5 | 0 | 0 | 0.98 | 0.2 | 0.5 | 0.25 | 0.1 | 0 | 0 | 0 | Surplus |
| Example11 | 7.6 | 22.8 | 0 | 0 | 0.98 | 0.25 | 0.5 | 0.35 | 0.2 | 0.1 | 0.25 | 0.15 | Surplus |
| Comparative example11 | 7.6 | 22.8 | 0 | 0 | 0.98 | 0.25 | 0.5 | 0.35 | 0.2 | 0.1 | 0.1 | 0.15 | Surplus |
| Example12 | 7.8 | 23.3 | 0 | 0 | 0.98 | 0.35 | 0.5 | 0.4 | 0.3 | 0 | 0.3 | 0 | Surplus |
| Comparative example12a | 7.8 | 23.3 | 0 | 0 | 0.98 | 0.7 | 0.5 | 0.4 | 0.3 | 0 | 0.3 | 0 | Surplus |
| Comparative example12b | 7.8 | 23.3 | 0 | 0 | 0.98 | 0.35 | 0.5 | 0.65 | 0.3 | 0 | 0.3 | 0 | Surplus |
| Comparative example12c | 7.8 | 23.3 | 0 | 0 | 0.98 | 0.35 | 0.5 | 0.4 | 1 | 0 | 0.3 | 0 | Surplus |
| Example13 | 8 | 24 | 0 | 0 | 0.98 | 0.4 | 0.5 | 0.45 | 0.45 | 0 | 0.35 | 0.2 | Surplus |
| Comparative example13 | 8 | 24 | 0 | 0 | 0.98 | 0.1 | 0.5 | 0.1 | 0.45 | 0 | 0.45 | 0.2 | Surplus |
| Example14 | 7.2 | 21.7 | 3 | 0 | 0.98 | 0.45 | 0.5 | 0.45 | 0.48 | 0.15 | 0.35 | 0 | Surplus |
| Comparative example14 | 7.2 | 21.7 | 3 | 0 | 0.98 | 0.45 | 0.5 | 0.45 | 0.48 | 0.15 | 0.55 | 0 | Surplus |

Example 10

The ingredients are prepared according to example 10 shown in Table 8, the obtained raw materials are smelted in a vacuum induction melting furnace, the obtained melt is cast at 1460° C., and cooled on a copper roll with a rotational speed of 40 rpm to obtain a neodymium iron boron alloy casting sheet with an average thickness of 0.30 mm. The casting sheet is subjected to hydrogen decrepitation, the kOe; and in example 10 and comparative example 10b, when Ti is not added, the coercivity is different by 2.70 kOe Example 11

The ingredients are prepared according to example 11 shown in Table 8, the obtained raw materials are smelted in a vacuum induction melting furnace, the obtained melt is cast at 1465° C., and cooled on a copper roll with a rotational speed of 40 rpm to obtain a neodymium iron boron alloy casting sheet with an average thickness of 0.28 mm. The casting sheet is subjected to hydrogen decrepitation, the hydrogen absorption time in the hydrogen decrepitation process is 1 h, the dehydrogenation time is 5 h, the dehydrogenation temperature is 600° C., and the cooling time is 2 h. The obtained powder is subjected to jet milling to obtain a powder with a particle size of 3.4 μm. The obtained powder is subjected to magnetic field orientation molding treatment under a magnetic field of 17500 Gauss in a sealed oxygen-free glove box, and then subjected to isostatic pressing treatment under 200 MPa to obtain a magnet blank. The magnet blank is sintered at 1070° C. for 6 h, then aged at 910° C. for 2 h, and finally aged at 525° C. for 5 h to obtain a neodymium iron boron magnet.

Comparative example 11 is prepared by the same procedure.

The neodymium iron boron magnet prepared by the above method of the present application and the ordinary neodymium iron boron magnet are compared in parallel tests. The comparison results are shown in Table 10. Table 10 is the performance data table of the magnets prepared in the examples and the comparative examples.

TABLE 10

Performance data table of magnets prepared in examples and comparative examples

| Sample label | Br (kGs) | Hcj (kOe) | Hk/Hcj |
| --- | --- | --- | --- |
| Example 11 | 14.18 | 18.6 | 0.98 |
| Comparative example 11 | 14.19 | 17.1 | 0.98 |

It can be seen from Table 1 and Table 3 that in example 11 and comparative example 11, Ti is less than the range, and the coercivity is different by 1.50 kOe.

Example 12

The ingredients are prepared according to example 12 shown in Table 8, the obtained raw materials are smelted in a vacuum induction melting furnace, the obtained melt is cast at 1468° C., and cooled on a copper roll with a rotational speed of 40 rpm to obtain a neodymium iron boron alloy casting sheet with an average thickness of 0.32 mm. The casting sheet is subjected to hydrogen decrepitation, the hydrogen absorption time in the hydrogen decrepitation process is 1 h, the dehydrogenation time is 5 h, the dehydrogenation temperature is 600° C., and the cooling time is 2 h. The obtained powder is subjected to jet milling to obtain a powder with a particle size of 3.4 μm. The obtained powder is subjected to magnetic field orientation molding treatment under a magnetic field of 17560 Gauss in a sealed oxygen-free glove box, and then subjected to isostatic pressing treatment under 200 MPa to obtain a magnet blank. The magnet blank is sintered at 1070° C. for 6 h, then aged at 910° C. for 2 h, and finally aged at 525° C. for 5 h to obtain a neodymium iron boron magnet.

Comparative example 12 is prepared by the same procedure.

The neodymium iron boron magnet prepared by the above method of the present application and the ordinary neodymium iron boron magnet are compared in parallel tests. The comparison results are shown in Table 11. Table 11 is the performance data table of the magnets prepared in the examples and the comparative examples.

TABLE 11

Performance data table of magnets prepared in examples and comparative examples

| Sample label | Br (kGs) | Hcj (kOe) | Hk/Hcj |
| --- | --- | --- | --- |
| Example 12 | 13.84 | 20.65 | 0.97 |
| Comparative example 12a | 13.81 | 19.23 | 0.98 |
| Comparative example 12b | 13.83 | 19.55 | 0.98 |
| Comparative example 12c | 13.83 | 19.35 | 0.98 |

It can be seen from Table 8 and Table 11 that in example 12 and comparative example 12a, Ti is the same, Cu is greater than the range, and the coercivity is different by 0.420 kOe; in example 12 and comparative example 12b, Ti is the same, Ga is greater than the range, and the coercivity is different by 1.10 kOe; and in example 12 and comparative example 12c, Ti is the same, Al is greater than the range, and the coercivity is different by 1.30 kOe.

Example 13

The ingredients are prepared according to example 13 shown in Table 8, the obtained raw materials are smelted in a vacuum induction melting furnace, the obtained melt is cast at 1458° C., and cooled on a copper roll with a rotational speed of 40 rpm to obtain a neodymium iron boron alloy casting sheet with an average thickness of 0.29 mm. The casting sheet is subjected to hydrogen decrepitation, the hydrogen absorption time in the hydrogen decrepitation process is 1 h, the dehydrogenation time is 5 h, the dehydrogenation temperature is 600° C., and the cooling time is 2 h. The obtained powder is subjected to jet milling to obtain a powder with a particle size of 3.4 μm. The obtained powder is subjected to magnetic field orientation molding treatment under a magnetic field of 17700 Gauss in a sealed oxygen-free glove box, and then subjected to isostatic pressing treatment under 200 MPa to obtain a magnet blank. The magnet blank is sintered at 1070° C. for 6 h, then aged at 910° C. for 2 h, and finally aged at 525° C. for 5 h to obtain a neodymium iron boron magnet. Comparative example 13 is prepared by the same procedure.

The neodymium iron boron magnet prepared by the above method of the present application and the ordinary neodymium iron boron magnet are compared in parallel tests. The comparison results are shown in Table 12. Table 12 is the performance data table of the magnets prepared in the examples and the comparative examples.

TABLE 12

Performance data table of magnets prepared in examples and comparative examples

| Sample label | Br (kGs) | Hcj (kOe) | Hk/Hcj |
| --- | --- | --- | --- |
| Example 13 | 13.44 | 22.07 | 0.97 |
| Comparative example 13 | 13.30 | 20.13 | 0.97 |

It can be seen from Table 8 and Table 13 that in example 13 and comparative example 13a, Ti is greater than the range, Cu and Ga are less than the range, and the coercivity is different by 1.94 kOe.

Example 14

The ingredients are prepared according to example 14 shown in Table 8, the obtained raw materials are smelted in a vacuum induction melting furnace, the obtained melt is cast at 1465° C., and cooled on a copper roll with a rotational speed of 40 rpm to obtain a neodymium iron boron alloy casting sheet with an average thickness of 0.28 mm. The casting sheet is subjected to hydrogen decrepitation, the hydrogen absorption time in the hydrogen decrepitation process is 1 h, the dehydrogenation time is 5 h, the dehydrogenation temperature is 600° C., and the cooling time is 2 h. The obtained powder is subjected to jet milling to obtain a powder with a particle size of 3.4 μm. The obtained powder is subjected to magnetic field orientation molding treatment under a magnetic field of 17500 Gauss in a sealed oxygen-free glove box, and then subjected to isostatic pressing treatment under 200 MPa to obtain a magnet blank. The magnet blank is sintered at 1070° C. for 6 h, then aged at 910° C. for 2 h, and finally aged at 525° C. for 4 h to obtain a neodymium iron boron magnet.

Comparative example 14 is prepared by the same procedure.

The neodymium iron boron magnet prepared by the above method of the present application and the ordinary neodymium iron boron magnet are compared in parallel tests. The comparison results are shown in Table 13. Table 13 is the performance data table of the magnets prepared in the examples and the comparative examples.

TABLE 13

Performance data table of magnets prepared in examples and comparative examples

| Sample label | Br (kGs) | Hcj (kOe) | Hk/Hcj |
|---|---|---|---|
| Example 14 | 12.62 | 26.94 | 0.96 |
| Comparative example 14 | 12.45 | 25.30 | 0.96 |

It can be seen from Table 8 and Table 13 that in example 14 and comparative example 14, Ti is greater than the range, and the coercivity is different by 1.66 kOe.

Example 15

The ingredients are prepared according to example 15 shown in Table 14, the obtained raw materials are smelted in a vacuum induction melting furnace, the obtained melt is cast at 1460° C., and cooled on a copper roll with a rotational speed of 40 rpm to obtain a neodymium iron boron alloy casting sheet with an average thickness of 0.30 mm. The casting sheet is subjected to hydrogen decrepitation, the hydrogen absorption time in the hydrogen decrepitation process is 1 h, the dehydrogenation time is 5 h, the dehydrogenation temperature is 580° C., and the cooling time is 2 h. The obtained powder is subjected to jet milling to obtain a powder with a particle size of 3.4 am. The obtained powder is subjected to magnetic field orientation molding treatment under a magnetic field of 17320 Gauss in a sealed oxygen-free glove box, and then subjected to isostatic pressing treatment under 200 MPa to obtain a magnet blank. The magnet blank is sintered at 1060° C. for 8 h, then aged at 880° C. for 8 h, and finally aged at 500° C. for 6 h to obtain a neodymium iron boron magnet.

Comparative examples 15a and 15b are prepared by the same procedure.

The neodymium iron boron magnet prepared by the above method of the present application and the neodymium iron boron magnet prepared by the comparative example 15 are compared in parallel tests. The comparison results are shown in Table 15. Table 15 is the performance data table of the magnets prepared in the examples and the comparative examples.

TABLE 15

Performance data table of magnets prepared in examples and comparative examples

| Sample label | Br (kGs) | Hcj (kOe) | Hk/Hcj |
|---|---|---|---|
| Example 15 | 14.58 | 15.30 | 0.98 |
| Comparative example 15a | 14.57 | 14.10 | 0.98 |
| Comparative example 15b | 14.59 | 13.14 | 0.99 |

TABLE 14

Raw material formula data table of examples (unit of number in the table is wt %)

| Number | Pr | Nd | Dy | Tb | B | Cu | Co | Ga | Al | Zr | Ti | Nb | Fe |
|---|---|---|---|---|---|---|---|---|---|---|---|---|---|
| Example15 | 6.1 | 23.9 | 0 | 0 | 0.94 | 0.2 | 0.5 | 0.25 | 0.1 | 0 | 0.1 | 0.4 | Surplus |
| Comparative example15a | 6.1 | 23.9 | 0 | 0 | 0.94 | 0.1 | 0.5 | 0.1 | 0.1 | 0 | 0.1 | 0.4 | Surplus |
| Comparative example15b | 6.1 | 23.9 | 0 | 0 | 0.94 | 0.2 | 0.5 | 0.25 | 0.1 | 0 | 0.1 | 0 | Surplus |
| Example16 | 6.2 | 24.2 | 0 | 0 | 0.95 | 0.25 | 0.5 | 0.3 | 0.2 | 0 | 0 | 0.3 | Surplus |
| Comparative example16 | 6.2 | 24.2 | 0 | 0 | 0.95 | 0.25 | 0.5 | 0.3 | 0.2 | 0 | 0 | 0.1 | Surplus |
| Example17 | 6.3 | 24.8 | 0 | 0 | 0.93 | 0.35 | 1 | 0.35 | 0.2 | 0 | 0 | 0.4 | Surplus |
| Comparative example17a | 6.3 | 24.8 | 0 | 0 | 0.93 | 0.7 | 1 | 0.35 | 0.2 | 0 | 0 | 0.2 | Surplus |
| Comparative example 17b | 6.3 | 24.8 | 0 | 0 | 0.93 | 0.35 | 1 | 0.65 | 0.2 | 0 | 0 | 0.2 | Surplus |
| Comparative example17c | 6.3 | 24.8 | 0 | 0 | 0.93 | 0.35 | 1 | 0.35 | 1 | 0 | 0 | 0.2 | Surplus |
| Example18 | 6 | 24 | 1.5 | 0 | 0.94 | 0.35 | 1 | 0.3 | 0.5 | 0.15 | 0.1 | 0.45 | Surplus |
| Comparative example18 | 6 | 24 | 1.5 | 0 | 0.94 | 0.15 | 1 | 0.2 | 0.5 | 0.15 | 0.1 | 0.9 | Surplus |
| Example19 | 5.9 | 23 | 3 | 0 | 0.96 | 0.25 | 1.5 | 0.35 | 0.5 | 0 | 0 | 0.55 | Surplus |
| Comparative example19 | 5.9 | 23 | 3 | 0 | 0.96 | 0.25 | 1.5 | 0.35 | 0.5 | 0 | 0 | 1.2 | Surplus |

It can be seen from Table 14 and Table 15 that in example 15 and comparative example 15a, Nb is the same, Cu and Ga are less than the range, and the coercivity is different by 1.20 kOe; and in example 15 and comparative example 15b, when Nb is not added, the coercivity is different by 2.16 kOe.

Example 16

The ingredients are prepared according to example 16 shown in Table 14, the obtained raw materials are smelted in a vacuum induction melting furnace, the obtained melt is cast at 1465° C., and cooled on a copper roll with a rotational speed of 40 rpm to obtain a neodymium iron boron alloy casting sheet with an average thickness of 0.28 mm. The casting sheet is subjected to hydrogen decrepitation, the hydrogen absorption time in the hydrogen decrepitation process is 1 h, the dehydrogenation time is 5 h, the dehydrogenation temperature is 580° C., and the cooling time is 2 h. The obtained powder is subjected to jet milling to obtain a powder with a particle size of 3.4 μm. The obtained powder is subjected to magnetic field orientation molding treatment under a magnetic field of 17500 Gauss in a sealed oxygen-free glove box, and then subjected to isostatic pressing treatment under 200 MPa to obtain a magnet blank. The magnet blank is sintered at 1050° C. for 8 h, then aged at 900° C. for 8 h, and finally aged at 510° C. for 7 h to obtain a neodymium iron boron magnet.

Comparative example 16 is prepared by the same procedure.

The neodymium iron boron magnet prepared by the above method of the present application and the ordinary neodymium iron boron magnet are compared in parallel tests. The comparison results are shown in Table 16. Table 16 is the performance data table of the magnets prepared in the examples and the comparative examples.

TABLE 16

| Performance data table of magnets prepared in examples and comparative examples | | | |
|---|---|---|---|
| Sample label | Br (kGs) | Hcj (kOe) | Hk/Hcj |
| Example 16 | 14.27 | 16.8 | 0.97 |
| Comparative example 16 | 14.25 | 15.5 | 0.97 |

It can be seen from Table 14 and Table 16 that in example 16 and comparative example 16, Nb is less than the range, and the coercivity is different by 1.30 kOe.

Example 17

The ingredients are prepared according to example 17 shown in Table 14, the obtained raw materials are smelted in a vacuum induction melting furnace, the obtained melt is cast at 1465° C., and cooled on a copper roll with a rotational speed of 40 rpm to obtain a neodymium iron boron alloy casting sheet with an average thickness of 0.32 mm. The casting sheet is subjected to hydrogen decrepitation, the hydrogen absorption time in the hydrogen decrepitation process is 1 h, the dehydrogenation time is 5 h, the dehydrogenation temperature is 580° C., and the cooling time is 2 h. The obtained powder is subjected to jet milling to obtain a powder with a particle size of 3.4 μm. The obtained powder is subjected to magnetic field orientation molding treatment under a magnetic field of 17560 Gauss in a sealed oxygen-free glove box, and then subjected to isostatic pressing treatment under 200 MPa to obtain a magnet blank. The magnet blank is sintered at 1065° C. for 8 h, then aged at 900° C. for 8 h, and finally aged at 510° C. for 7 h to obtain a neodymium iron boron magnet.

Comparative examples 17a, 17b and 17c are prepared by the same procedure.

The neodymium iron boron magnet prepared by the above method of the present application and the ordinary neodymium iron boron magnet are compared in parallel tests. The comparison results are shown in Table 17. Table 17 is the performance data table of the magnets prepared in the examples and the comparative examples.

TABLE 17

| Performance data table of magnets prepared in examples and comparative examples | | | |
|---|---|---|---|
| Sample label | Br (kGs) | Hcj (kOe) | Hk/Hcj (%) |
| Example 17 | 14.13 | 18.75 | 0.98 |
| Comparative example 17a | 14.11 | 17.65 | 0.98 |
| Comparative example 17b | 14.13 | 17.55 | 0.97 |
| Comparative example 17c | 14.12 | 17.38 | 0.98 |

It can be seen from Table 14 and Table 17 that in example 17 and comparative example 17a, Nb is the same, Cu is greater than the range, and the coercivity is different by 1.10 kOe; in example 17 and comparative example 17b, Nb is the same, Ga is greater than the range, and the coercivity is different by 1.20 kOe; and in example 17 and comparative example 17c, Nb is the same, Al is greater than the range, and the coercivity is different by 1.37 kOe.

Example 18

The ingredients are prepared according to example 18 shown in Table 14, the obtained raw materials are smelted in a vacuum induction melting furnace, the obtained melt is cast at 1460° C., and cooled on a copper roll with a rotational speed of 40 rpm to obtain a neodymium iron boron alloy casting sheet with an average thickness of 0.29 mm. The casting sheet is subjected to hydrogen decrepitation, the hydrogen absorption time in the hydrogen decrepitation process is 1 h, the dehydrogenation time is 5 h, the dehydrogenation temperature is 580° C., and the cooling time is 2 h. The obtained powder is subjected to jet milling to obtain a powder with a particle size of 3.4 μm. The obtained powder is subjected to magnetic field orientation molding treatment under a magnetic field of 17700 Gauss in a sealed oxygen-free glove box, and then subjected to isostatic pressing treatment under 200 MPa to obtain a magnet blank. The magnet blank is sintered at 1060° C. for 6 h, then aged at 890° C. for 8 h, and finally aged at 510° C. for 6 h to obtain a neodymium iron boron magnet.

Comparative example 18 is prepared by the same procedure.

The neodymium iron boron magnet prepared by the above method of the present application and the ordinary neodymium iron boron magnet are compared in parallel tests. The comparison results are shown in Table 18. Table 18 is the performance data table of the magnets prepared in the examples and the comparative examples.

TABLE 18

Performance data table of magnets prepared in examples and comparative examples

| Sample label | Br (kGs) | Hcj (kOe) | Hk/Hcj (%) |
|---|---|---|---|
| Example 18 | 13.25 | 21.6 | 0.98 |
| Comparative example 18 | 13.21 | 20.1 | 0.98 |

It can be seen from Table 14 and Table 18 that in example 18 and comparative example 18, Nb is greater than the range, Cu and Ga are less than the range, and the coercivity is different by 1.50 kOe.

Example 19

The ingredients are prepared according to example 19 shown in Table 14, the obtained raw materials are smelted in a vacuum induction melting furnace, the obtained melt is cast at 1465° C., and cooled on a copper roll with a rotational speed of 40 rpm to obtain a neodymium iron boron alloy casting sheet with an average thickness of 0.28 mm. The casting sheet is subjected to hydrogen decrepitation, the hydrogen absorption time in the hydrogen decrepitation process is 1 h, the dehydrogenation time is 5 h, the dehydrogenation temperature is 590° C., and the cooling time is 2 h. The obtained powder is subjected to jet milling to obtain a powder with a particle size of 3.4 μm. The obtained powder is subjected to magnetic field orientation molding treatment under a magnetic field of 17500 Gauss in a sealed oxygen-free glove box, and then subjected to isostatic pressing treatment under 200 MPa to obtain a magnet blank. The magnet blank is sintered at 1060° C. for 8 h, then aged at 900° C. for 7 h, and finally aged at 500° C. for 6 h to obtain a neodymium iron boron magnet.

Comparative example 19 is prepared by the same procedure.

The neodymium iron boron magnet prepared by the above method of the present application and the ordinary neodymium iron boron magnet are compared in parallel tests. The comparison results are shown in Table 19. Table 19 is the performance data table of the magnets prepared in the examples and the comparative examples.

TABLE 19

Performance data table of magnets prepared in examples and comparative examples

| Sample label | Br (kGs) | Hcj (kOe) | Hk/Hcj |
|---|---|---|---|
| Example 19 | 12.59 | 26.8 | 0.97 |
| Comparative example 19 | 12.55 | 24.8 | 0.97 |

It can be seen from Table 14 and Table 19 that in example 19 and comparative example 19, Nb is greater than the range, and the coercivity is different by 2.00 kOe.

The descriptions of the above embodiments are only used to help understand the method and the core idea of the present application. It should be pointed out that for those skilled in the art, without departing from the principle of the present application, several improvements and modifications can also be made to the present application, and these improvements and modifications also fall within the protection scope of the claims of the present application.

The above description of the disclosed embodiments enables any person skilled in the art to make or use the present application. Various modifications to these embodiments will be readily apparent to those skilled in the art, and the generic principles defined herein may be implemented in other embodiments without departing from the spirit or scope of the application. Thus, the present application is not intended to be limited to the embodiments shown herein, but is to be accorded the widest scope consistent with the principles and novel features disclosed herein.

The invention claimed is:

1. A sintered neodymium iron boron magnet is shown in formula (I);

$$R_xT_{100-x-y1-y2-z}M_{y1}A_{y2}B_z \quad (I);$$

x, y1, y2 and z are mass percentages of corresponding elements, 28.5%≤x≤32.5%, 0%≤y1≤1.0%, 0.67%≤y2≤2.4%, 0.90%≤z≤0.96%;

R is selected from one or more of Pr, Nd, and Dy, wherein a content of Pr is 5% to 14.5%, a content of Nd is 20% to 25.5%, and a content of Dy is 0 to 3%;

M is selected from one or more of Ti, Nb; and a content of Ti is 0 to 0.1%, a content of Nb is 0 to 0.15%;

A is Cu, Ga, Al and Zr, wherein a content of Cu is 0.2% to 0.6%, a content of Ga is 0.25% to 0.5%, a content of Al is 0.1% to 0.5%, and a content of Zr is 0.2% to 0.6%; and T is selected from Fe and Co, a content of Co is 0.5% to 2.5%, and surplus is Fe;

wherein the sintered neodymium iron boron magnet comprises Zr—Cu alloy phase, Cu—Ga alloy phase, and $R_6Fe_{13}A$ compound, wherein the $R_6Fe_{13}A$ compound is $R_6Fe_{13}Cu$, $R_6Fe_{13}Ga$, $R_6Fe_{13}Al$ and $R_6Fe_{13}Zr$.

2. The sintered neodymium iron boron magnet according to claim 1, wherein the content of Pr is 5% to 10%, the content of Nd is 20% to 25.5%, and the content of Dy is 0 to 3%.

3. The sintered neodymium iron boron magnet according to claim 1, wherein, a content of Cu is 0.3% to 0.5%, a content of Ga is 0.35% to 0.5%, a content of Al is 0.1% to 0.5%, and a content of Zr is 0.3% to 0.6%.

4. The sintered neodymium iron boron magnet according to claim 1, wherein, the content of Co is 0.5% to 2.0%.

5. A method of preparing the sintered neodymium iron boron magnet according to claim 1, comprising the following steps:

A) carrying out a strip casting treatment to a raw material of a neodymium iron boron sintered magnet to obtain a neodymium iron boron strip casting;

B) carrying out hydrogen decrepitation and jet milling on the neodymium iron boron strip casting in sequence to obtain neodymium iron boron powder; and C) orientation molding and sintering the neodymium iron boron powder in sequence to obtain the sintered neodymium iron boron magnet.

6. The method according to claim 5, wherein a temperature of the strip casting treatment is 1400° C. to 1500° C., and a thickness of the neodymium iron boron strip casting is 0.10 mm to 0.60 mm;

in the hydrogen decrepitation process, a hydrogen absorption time is 1 h to 3 h, a hydrogen absorption temperature is 20° C. to 300° C., a dehydrogenation time is 3 h to 7 h, and a dehydrogenation temperature is 550° C. to 600° C.; and in the jet milling process, a lubricant is added for milling, and the lubricant is 0.02% to 0.1% of a mass of a mixed fine powder obtained by the hydrogen decrepitation, and a particle size of the jet-milled powder is 2 μm to 10 μm.

7. The method according to claim 5, wherein, the orientation molding comprises orientation pressing and isostatic pressing in sequence;
- a magnetic field strength of the orientation molding is 1.2 T to 3 T;
- a sintering temperature is 1000° C. to 1200° C., a time is 5 h to 15 h, and a vacuum degree is less than or equal to 0.02 Pa;
- wherein the method further comprises an aging treatment after sintering, and the aging treatment comprises a first aging treatment and a second aging treatment;
- a temperature of the first aging treatment is 800° C. to 980° C., and a time of the first aging treatment is 2 h to 15 h; and
- a temperature of the second aging treatment is 420° C. to 580° C., and a time of the second aging treatment is 1 h to 8 h.

\* \* \* \* \*